(12) United States Patent
Tobler et al.

(10) Patent No.: US 7,197,383 B2
(45) Date of Patent: Mar. 27, 2007

(54) SYSTEM FOR LIMITING REACTIVE TORQUE IN POWERTRAINS

(75) Inventors: Bill Tobler, Willis, MI (US); Michael Tiller, Canton, MI (US); Paul Bowles, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 10/780,381

(22) Filed: Feb. 17, 2004

(65) Prior Publication Data

US 2005/0182533 A1    Aug. 18, 2005

(51) Int. Cl.
*G05D 1/00* (2006.01)

(52) U.S. Cl. .............................. 701/22; 701/48; 701/53; 701/69; 701/87

(58) Field of Classification Search ...................... None
See application file for complete search history.

(56) References Cited

U.S. PATENT DOCUMENTS

| | | | |
|---|---|---|---|
| 4,792,194 A | 12/1988 | Hayashi et al. | |
| 4,827,798 A * | 5/1989 | Oldfield | 188/269 |
| 5,209,203 A | 5/1993 | Kaltenbrunn et al. | |
| 5,325,946 A * | 7/1994 | Kashiwabara et al. | 192/3.31 |
| 5,511,867 A | 4/1996 | Luckevich et al. | |
| 5,654,887 A * | 8/1997 | Asa et al. | 701/22 |
| 5,861,744 A | 1/1999 | Earl | |
| 5,863,274 A * | 1/1999 | Jackel | 475/347 |
| 5,923,093 A * | 7/1999 | Tabata et al. | 290/40 C |
| 5,931,887 A | 8/1999 | Hac | |
| 5,935,043 A * | 8/1999 | Watanabe et al. | 477/169 |
| 5,989,156 A * | 11/1999 | Matsubara et al. | 477/169 |
| 6,070,680 A * | 6/2000 | Oyama | 180/65.2 |
| 6,122,584 A | 9/2000 | Lin et al. | |
| 6,125,319 A | 9/2000 | Hac et al. | |
| 6,149,544 A * | 11/2000 | Masberg et al. | 477/13 |

FOREIGN PATENT DOCUMENTS

JP     06094122 A  *  4/1994

* cited by examiner

*Primary Examiner*—Richard M. Camby
(74) *Attorney, Agent, or Firm*—David B. Kelley; Tung & Associates

(57) ABSTRACT

A control system limits reactive torque in a powertrain that is generated when braking force is applied to traction wheels during a sudden stop or other sudden braking event. The reactive torque generated at the traction wheels is prevented from being transmitted upstream through the driveline and powertrain by using a slip type clutch in the driveline to limit the upstream transfer of the reactive wheel torque. The clutch is directly actuated by the reactive torque and therefore does not require special controls or monitoring systems to sense the braking event. The clutch pressure may be automatically adjusted in response to certain operating conditions or events, thereby adjusting the point at which the clutch begins to slip due to reactive wheel torque.

22 Claims, 5 Drawing Sheets

US 7,197,383 B2

SYSTEM FOR LIMITING REACTIVE TORQUE IN POWERTRAINS

FIELD OF THE INVENTION

This invention generally relates to vehicle powertrains, and deals more particularly with a system for limiting reactive torque developed in a powertrain due to sudden changes in the inertia of powertrain components.

BACKGROUND OF THE INVENTION

Environmental concerns and the need for fuel conservation has spurred the development of new hybrid propulsion systems for vehicles. Hybrid electric vehicle (HEV) powertrains for example, typically include electric traction motors, high voltage electric energy storage systems, and modified transmissions. Electric energy storage systems include batteries and ultra capacitors. Primary power units for these systems may include spark ignition engines, compression ignition direct injection (e.g., diesel) engines, gas turbines and fuel cells.

HEV powertrains are typically arranged in series, parallel or parallel-series configurations. With parallel-series arrangements, multiple motors operating in multiple operating modes sometimes require the use of several gear sets to effectively transmit power to the traction wheels. As a result, HEV powertrains often possess considerable effective inertia at the wheels compared to conventional ICE powertrains. This is due in part to the potentially large inertia of the hybrid motor devices, as well as the significant gearing from motor to wheels that is often employed.

Powertrains possessing relatively high effective inertias such as those of HEVs, result in certain problems that require solutions. For example, the application of braking force to the vehicle's traction wheels during a sudden braking event, may result in a very rapid angular momentum change in the powertrain. Specifically, a rapid deceleration of the traction wheels during braking results in a counter-torque being transmitted from the traction wheels back through the driveline. Because many of the components connected in the driveline have relatively large effective inertias at the wheels, the counter-torque produced by the braking event can produce relatively high reactive torque levels in the powertrain. This reaction torque is transmitted through the gearing mechanisms to the transmission housing, and can have deleterious effects on powertrain and driveline components, particularly under sudden braking conditions, such as when the vehicle's ABS system is activated.

Fluctuating driveline torques, which are transmitted through the vehicle's halfshafts, act to accelerate or decelerate the wheels, thereby potentially reducing the effectiveness of the vehicle's ABS system which is not designed to take into consideration dynamic powertrain reaction torque. Additionally, fluctuating driveline torque can produce noise, vibration and harshness (NVH) in the powertrain and driveline, and in some cases can even cause the vehicle's ABS to excite the vehicle powertrain at its natural frequency, thereby imposing additional undesirable stress on the powertrain.

Accordingly, there is a need in the art for a system for reducing or limiting reactive torque during operating conditions that impose high inertial forces on driveline components. The present invention is intended to satisfy this need.

SUMMARY OF THE INVENTION

One advantage of the invention lies in providing a system for limiting reactive torque in powertrains produced by high braking forces applied to traction wheels. The inventive system reduces or eliminates these reactive forces through the use of relatively simple powertrain components such as a slip clutch which partially disconnects the wheels from the driveline during sudden braking events. An important advantage of the invention is that the control system is passive, in that it is directly and automatically activated by reactive torque generated by the sudden braking event, and does not require event or condition sensors to initiate the disconnect process. Moreover, when the sudden braking event ends, the system automatically and immediately reconnects the wheels to the powertrain. A further advantage of the present system resides in its compatibility with a wide range of HEV configurations and powertrain geometries, and the simplicity of its components. Another feature of the invention is that while the system limits undesirable levels of reactive torque, it permits lesser levels of negative torque to be transmitted from the wheels to the driveline during regenerative braking modes of powertrain operation.

In accordance with a first embodiment of the invention, a method is provided for controlling a vehicle powertrain during a sudden braking event, which includes limiting the amount of reactive wheel torque transmitted from the wheels to the powertrain. The amount of the reactive torque transmitted to the powertrain is limited by using a slip clutch in the driveline which automatically slips when the reactive torque applied to it reaches a preselected value. In an alternate embodiment, the clutch pressure is adjustable, allowing control of the amount of reactive torque that is transmitted from the wheels through the clutch to the powertrain.

Other features and advantages of the present invention may be better understood by considering the following details of a description of a preferred embodiment of the invention. In the course of this description, reference will frequently be made to the attached drawings.

DETAILED DESCRIPTION OF THE PREFERRED EMBODIMENT

Figure 6:
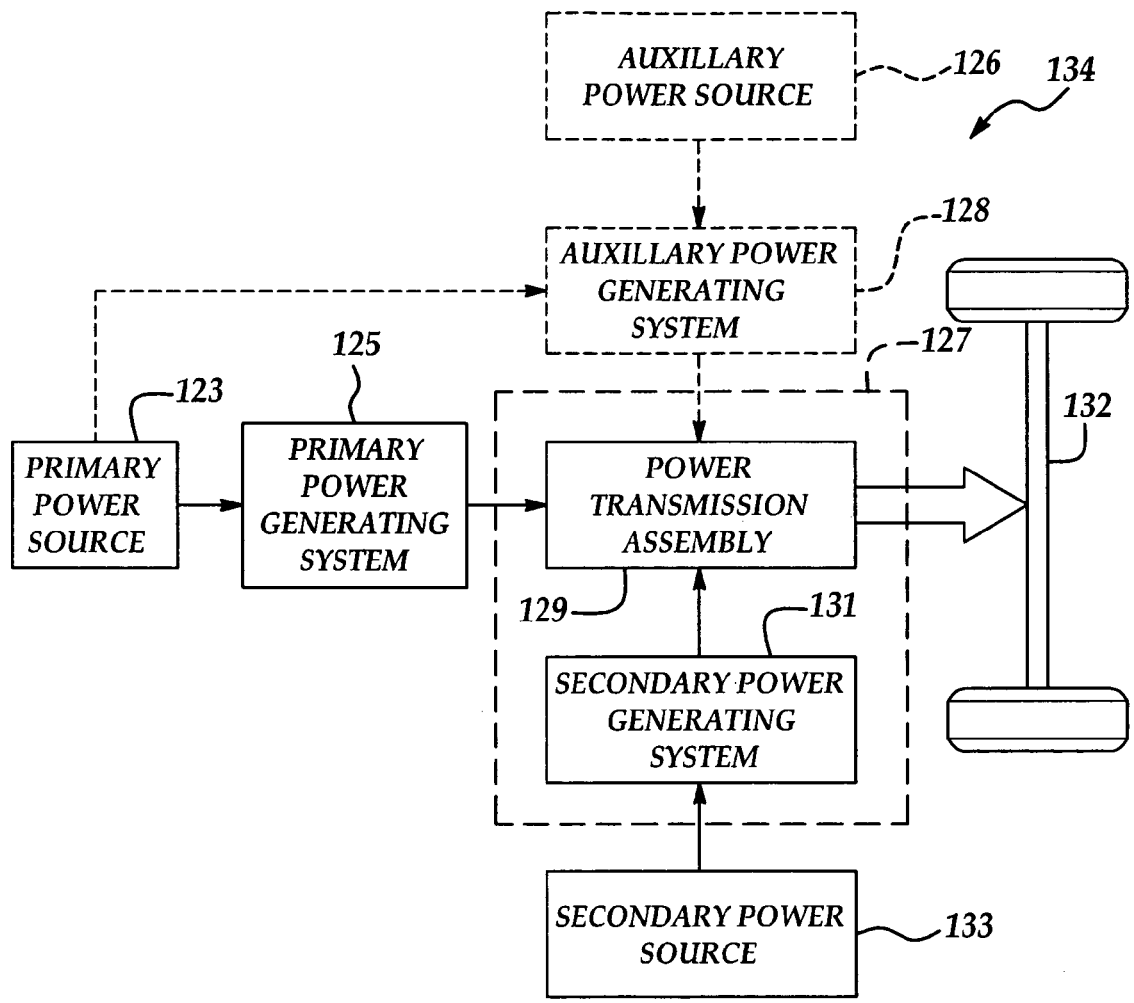
FIG. 6 is a block diagram of a generic architecture for a hybrid vehicle system; and, FIGS. 7A–7C are block diagrams showing exemplary hybrid powertrain system configurations.

FIG. 6 shows a generic architecture for a hybrid vehicle system 134, to which the present invention may be applied. The system 134 includes a primary power source 123, such as a gasoline, diesel or other gas fuel supply, coupled to a primary power generating system 125, such as an internal combustion engine. The primary power generating system 125 generates a primary drive torque that is transmitted to the vehicle's driveline 132 via power transmission assembly 129. The power transmission assembly 129 can be a conventional manual, automatic or continuously variable automotive transmission, or other equivalent gearing mechanism for transmitting mechanical power produced by the primary power generating system 125. The system 134 further includes a secondary power source 133, such as a battery, ultracapacitor, hydraulic accumulator or other energy storage device, and secondary power generating system 131, such as one or more electric machines or other torque generating devices, for supplementing the drive torque delivered by the primary power generating system 125. The system may further include an auxiliary power source 126 coupled to an auxiliary power generating system 128, such as a fuel cell system or Auxiliary Power Unit (APU) for providing additional drive torque.

The primary power generating system 125 may, for example, be a gasoline, natural gas, hydrogen or other gaseous, fuel-burning internal combustion engine. Power transmission assembly 129 transmits the output of both the internal combustion engine 125 and the secondary power generating system 131 to the vehicle driveline 132. The power transmission assembly 129 may be a converter-less automatic transmission constructed and arranged with the secondary power generating system 131, such as an integrated high voltage electric motor/generator. The power transmission assembly 129 and secondary generating system 131 can be packaged into a single modular hybrid transmission unit 127

Figure 7A:
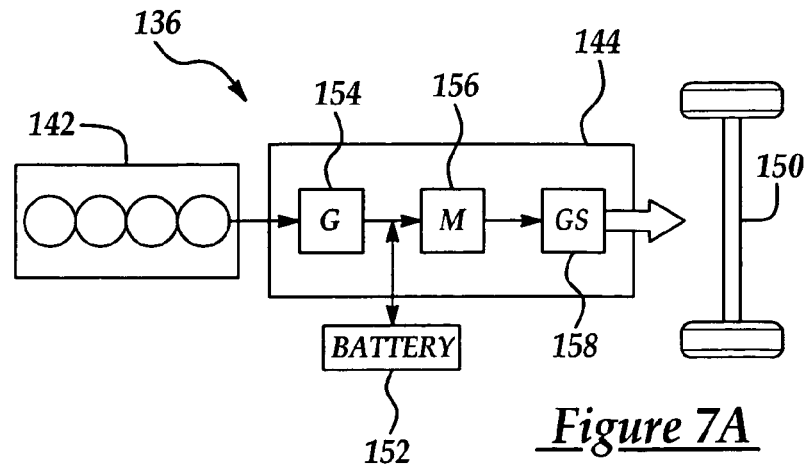
Figure 7B:
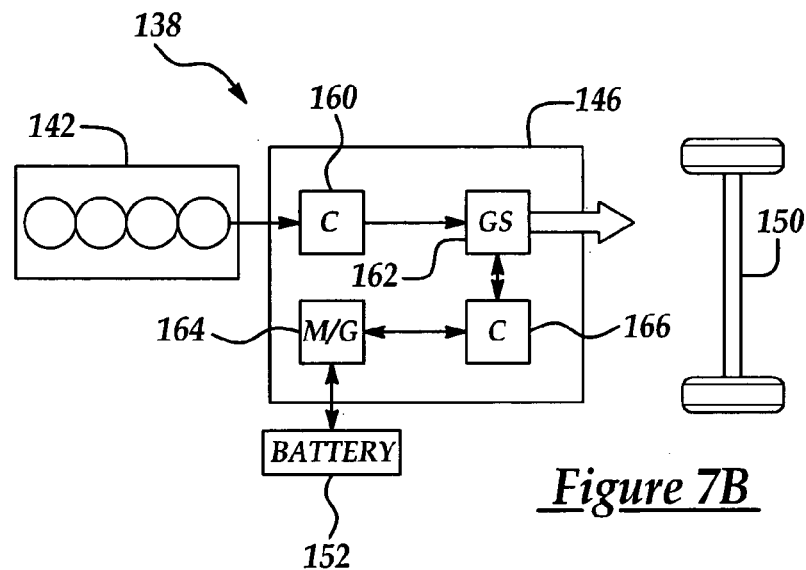
Figure 7C:
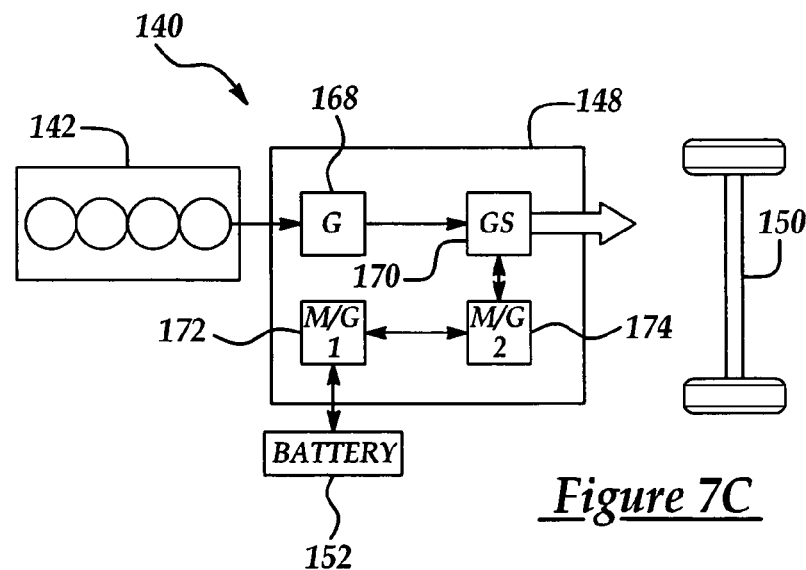

FIGS. 7A through 7C show exemplary hybrid powertrain system configurations that may be used to implement the present invention. The systems shown in FIGS. 7A–7C are shown by way of example and not limitation.

FIG. 7A depicts a socalled "series"0 hybrid configuration 136 having an internal combustion engine 142 coupled to a modular hybrid transmission unit 144. Modular hybrid transmission unit 144 includes an electric generator 154 that produces electrical energy for powering the vehicle drive wheels 150 via an electric motor 156 and gear set 158. Electrical storage device 152 stores electrical energy via the generator 154 when the internal combustion engine produces more power than required, and supplements engine power via the electric motor when power demand exceeds the engine power output. FIG. 75 show a so-called "parallel"0 hybrid configuration 139 wherein modular hybrid transmission unit 146 delivers driveline torque via a first power path having the internal combustion engine 142, a coupling device 160 and a gear set 162. The coupling devices 160, can be any suitable devices, for example a gear set or clutch, for transmitting mechanical energy to the vehicle driveline 150. The coupling devices 160, 166 can be the same device. FIG. 5C shows a so-called "parallel-series"0 configuration 140 wherein a modular hybrid transmission unit 148 includes motor/generators 172, 174 electrically and/or mechanically coupled, for example via planetary gearset, to deliver power to a gearset 170 and driveline 150.

Figure 1:
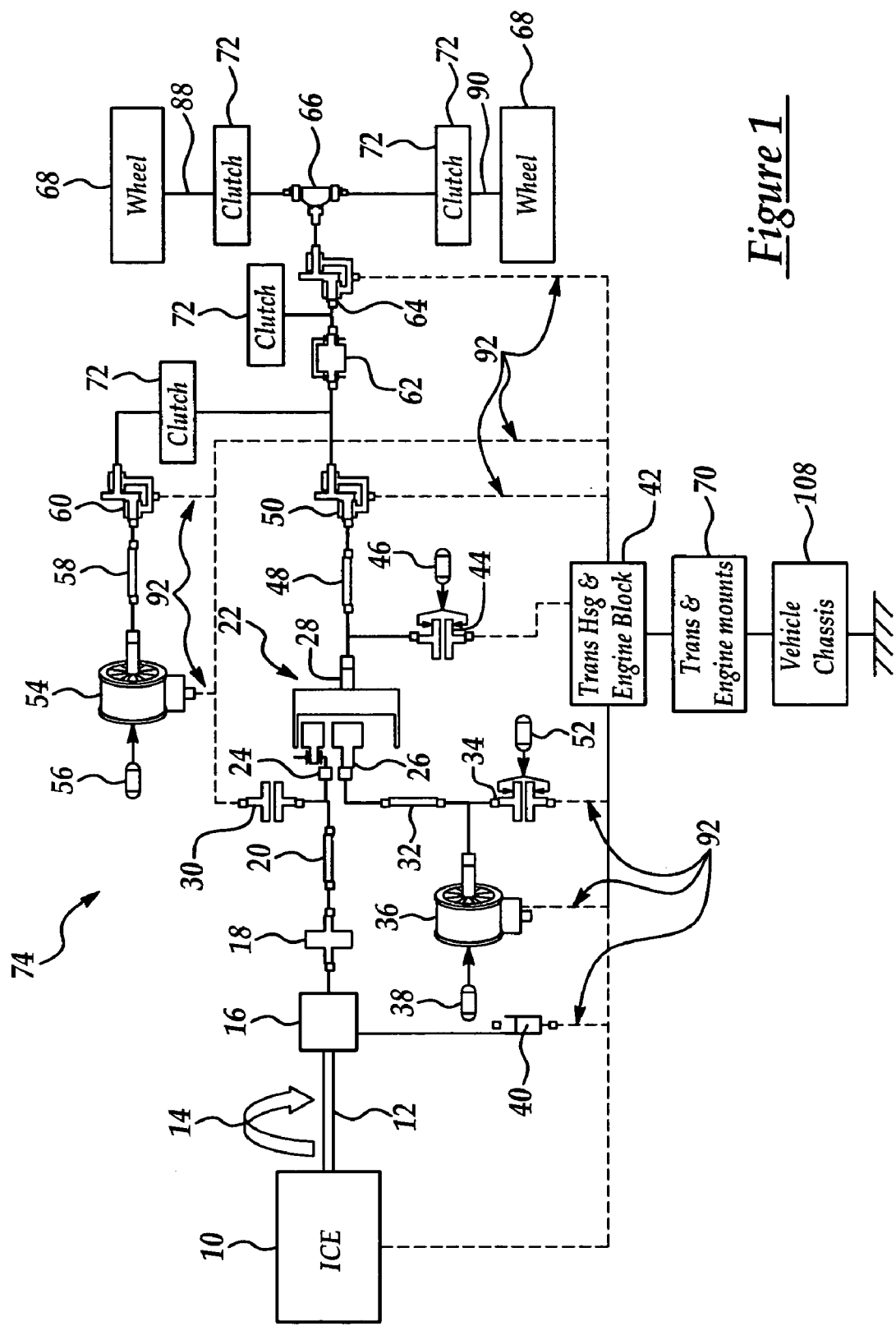
FIG. 1 is a combined block and diagrammatic view of a powertrain for a hybrid electric vehicle, employing a system for limiting reactive driveline torque, which forms one embodiment of the present invention.

Referring now to FIG. 1, a high effective inertia powertrain 74 for driving a vehicle is depicted. In the illustrated embodiment, the powertrain 74 is suitable for use in an HEV utilizing one or more fuel and/or motor drives. As shown, the powertrain 74 includes an internal combustion engine (ICE) 10 and a DC electric motor 54, each connected through a later-described driveline to drive a pair of traction wheels 68. The engine 10 has a crankshaft 12 rotating in the direction of arrow 14, which is connected to the driveline by a suitable input coupling 16. The rotating friction of the engine 10 is schematically indicated by the damper 40. Torque is transmitted by the input coupling 16 through a rigid or compliant shaft 20 to a planetary gear set 22. A damper 18 between the input coupling 16 and the shaft 20 functions to isolate torsional fluctuations transmitted from the engine 10 to the transmission line.

The planetary gear set 22 includes a carrier gear 24 and sun gear 26 driving a ring gear 28. A one-way clutch 30 connected between the carrier gear 24 and a transaxle housing 42 functions to prevent the engine 10 from rotating in a reverse direction. The sun gear 26 is connected through an output shaft 32 of an electric motor generator 36 whose speed is controlled by a torque control signal delivered to its control input 38. The speed of the carrier gear 24 and the engine 10 is a function of the speeds of the ring gear 28 and the sun gear 26. Thus, generator 36 is used to control the speed of the engine 10 by changing the speed of the sun gear 26. The use of the generator 36 to control the speed of the engine 10 may be used in an intelligent control system to control engine speed independent of driveline speed. A clutch 34 operated by a control signal at its input 52 functions to selectively lock the generator 36 against rotation. Locking the generator 36 prevents the sun gear 26 from rotating, the result of which is the planetary gear 22 directly connects the engine 10 to the traction wheels 68.

Ring gear 28 is connected through countershaft 48 and gear assemblies 50, 64 to a torque splitting device in the form of a differential 66. A parking brake 44 actuated by control signal at its input 46 is connected to and selectively locks the countershaft 48 against rotation. Gear assemblies 50, 64 possess inertia represented by the numeral 62. The differential 66 splits the driveline torque and delivers it through a pair of half shafts 88, 90 respectively to the traction wheels 68.

A second power source for driving traction wheels 68 is provided by the DC electric motor 54 whose speed is determined by a torque control signal received at its input 56. Motor 54 provides the dual function of driving the traction wheels 68 and acting as a regenerative braking generator. During vehicle braking, the motor 54 functions as an electrical generator using kinetic energy of the vehicle to generate electricity that is stored in a battery (not shown) for later use. The motor 54 delivers torque at its output shaft 58 through a gear set 60 to the differential 66, which in turn transmits the torque to the traction wheels 68. The motor 54 possesses a relatively high effective inertia at the wheels due in part to its own inertia as well as that of the gear assemblies 60 and 64.

The powertrain 74 described above possesses a relatively high amount of effective rotating inertia at the wheels, compared to the powertrain of a conventional ICE powered vehicle. This relatively high amount of effective rotating inertia is partially due to the use of multiple drive motors, motor controls and gear sets that are necessary to manage the delivery of power to the traction wheels 68. A major portion of this inertia is attributable to the electric motor 54 and the gear sets 60 and 64 that mechanically connect it to the traction wheels 68. The gear sets 22 and 50 also materially contribute to the effective powertrain inertia, as does the ICE 10 and the generator 36.

The various component parts of the powertrain 74 are mechanically connected either directly or indirectly to a transaxle housing and ICE engine block 42. The transaxle housing and engine block 42 are in turn carried on corresponding transaxle and engine block mounts 70 that are secured to the vehicle's chassis 108. The mechanical mounting or connection of these various components is schematically represented by the various broken lines 92 connecting these components to transaxle housing and engine block 42.

Thus, numerous components, including gear assemblies transmit torque to mountings on the transaxle housing and engine block 42, which in turn transfer this torque to the mounts 70.

In the event of a sudden braking event, as occurs when the vehicle's ABS system is actuated, the braking force applied to the traction wheels 68 causes rapid deceleration of these wheels, in turn resulting in a rapid deceleration of the powertrain that is mechanically connected to the wheels 68. This rapid deceleration of the powertrain, which has a large effective inertia, produces a commensurately large reactive torque which is transferred back through the driveline 74. This reactive-torque is transmitted to each of the powertrain components where it is applied to the transaxle housing and engine block 42, and their mounts 70. The reactive forces on the transaxle housing and engine block 42, as well as their chassis mounts 70 are particularly high because of the large effective rotating inertia of the powertrain 74. As a result, the reactive forces applied to the transaxle housing and block 42, and the mounts 70 may be sufficient to degrade these components under certain sudden braking conditions. Even under less stressful braking conditions the relatively high powertrain inertia and torque levels can produce undesirable noise, vibration and harshness (NVH). Furthermore, large fluctuating torques in the powertrain can reduce the performance of the ABS system which ordinarily does not account for the type of dynamic powertrain reaction torques described above.

In accordance with the present invention rapid changes in powertrain angular momentum stemming from sudden braking is controlled by limiting or eliminating the amount of reactive torque transmitted between the traction wheels 68 and the upstream powertrain components, particularly those contributing higher effective rotational inertias. As will be described below, this inertial control can be carried out by either completely disconnecting high inertia powertrain components from the wheels 68 in response to a braking event, or by reducing the amount of reactive torque transmitted through the driveline during a braking event. In accordance with the present invention, limiting and control of the reactive torque may be achieved using one or more torque limiting devices for selectively limiting the reactive torque that is transmitted upstream in the driveline from the wheels 68 to high inertial components of the powertrain 74, under certain conditions. For sake of simplicity and illustration, several types of clutches will be disclosed herein as the means for limiting transmission of the reactive torque, however it is to be understood that various other devices and technologies may be utilized.

Thus, a clutch 72 may be interposed between gear sets 60 and 64 to disengage the electric motor 54 from the differential 66. Alternatively, a clutch 72 may be interposed between gear sets 50 and 64 to disengage both the electric motor 54 and engine 10. In order to effect even greater control over powertrain inertia and reactive driveline torque, one or two clutches 72 may be installed between the differential 66 and the traction wheels 68, thereby allowing disengagement of the entire powertrain 74 from the traction wheels 68.

Figure 2:
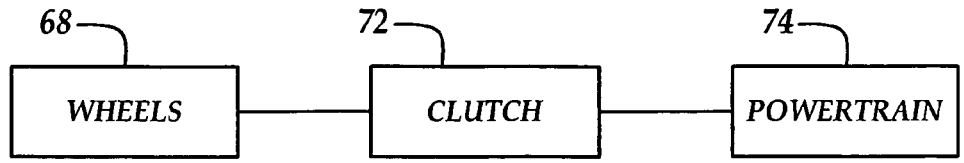
FIG. 2 is a block diagram showing an embodiment of invention which employs passive clutch control.

Referring now also to FIG. 2, the exact construction of the clutch 72 or other torque limiting device will depend on the particular application and available packaging geometries. Significantly however, according to the present invention, the clutch 72 is of a type that is both automatically and directly activated by the reactive torque generated at the wheels 68 during the braking event. Consequently, there is no need for a separate control system to sense the sudden braking event and activate the clutch 72. Moreover, the slip clutch 72 reacts virtually instantaneously to reactive torque produced by sudden braking. One type of clutch suitable for use is a so-called slip clutch which is well known in the art. Under normal conditions, when the slip clutch engaged, all of the torque applied to the input side of the clutch is transferred to its output side which is driving a load, consequently, the clutch's input and output shafts rotate at the same speed. When, however, the either the torque applied at the input of the clutch or a counter-torque applied at its output exceeds a preset value, the internal mechanism of the clutch "slips" such that the magnitude of the torque transmitted through the clutch either upstream or downstream is limited to the preset value.

When employed in the inventive system, a slip clutch 72 is normally engaged so as to transmit all of the torque produced by the ICE 10 or the motor 54 to the wheels 68. In the event of a braking event that generates a reactive torque exceeding the "preset" value, the clutch 72 slips in response to the reactive torque applied to its output, thereby preventing this reactive torque from being transmitted upstream in the driveline. In effect, the reactive torque causes the slip clutch 72 to partially disengage the wheels 68 from the driveline upstream of the clutch 72.

Figure 4:
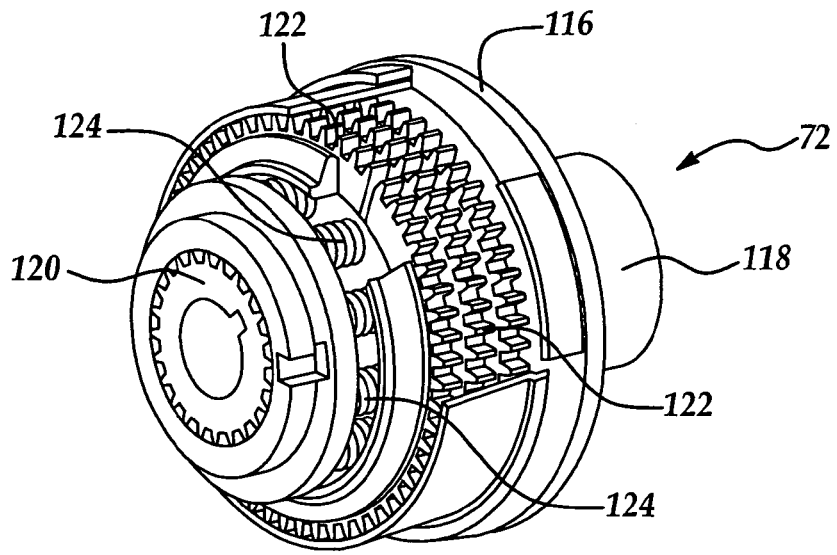
FIG. 4 is a perspective view of a typical slip clutch.

A typical, commercially available slip clutch 72 is shown in FIG. 4. Two sets of rotating friction plates 122 disposed within a clutch housing 116 are respectively fixed to input and output shafts 118, 120. A set of springs 124 normally bias the plates 122 into tight frictional engagement with each other, thereby creating a direct drive between the input shaft 118 and the output shaft 120. The springs 124 are selected to apply a preset pressure to the plates 122. When the torque applied to the input shaft 118 exceeds the amount allowed to be transmitted to the output shaft 120, the plates 122 slip relative to each other, thereby limiting the amount of torque that is transmitted from the input side of the clutch to its output side. Similarly, when a reactive counter-torque is applied to output shaft 120 which is greater than can be transmitted through the clutch plates 124, the plates 124 slip and thereby limit the counter-torque that is transmitted from the output shaft 120 upstream to the input shaft 118.

Other types of torque limiting devices can be used in the present invention. For example the clutch 72 may be a magnetic clutch which uses electromagnetic force to connect input and output shafts; a reactive counter-torque applied to the output shaft which exceeds the applied electromagnetic clutch force results in slippage between the input and output shafts of the clutch. In the illustrated embodiment, where the wheels 68 drive the motor 54 in a regenerative braking mode, it is important that the clutch 72 be of a type capable of transmitting both positive and negative torque. In other words, the clutch 72 must transmit torque from the powertrain 74 to the wheels 68 and from the wheels 68 back to the powertrain 74.

In a simple implementation of the invention, reactive torque limiting is achieved using a passive system which is activated directly and solely by the imposition of a certain magnitude of reactive torque on the output shaft of the clutch 72. The torque transmitting ability of the slip clutch 72 is set at a value that is sufficient to transmit "positive" torque from the powertrain to the traction wheels 68 under a range of normal operating conditions, as well as negative torque from the wheels 68 to the powertrain 74 during regenerative braking; however, this preset torque level is also chosen such that excessive torque levels i.e. those created during sudden braking are not transmitted back to the powertrain 74. Thus, as shown in FIG. 2, when a braking event creates reactive torque at the wheels 68, the clutch responds directly to this event by slipping, so as to limit or eliminate transmission of the reactive torque to the driveline components and the powertrain 74 upstream of the clutch 72. In this embodiment of the invention, the level of reactive torque which causes the clutch 72 to slip is fixed or preset.

Figure 3:
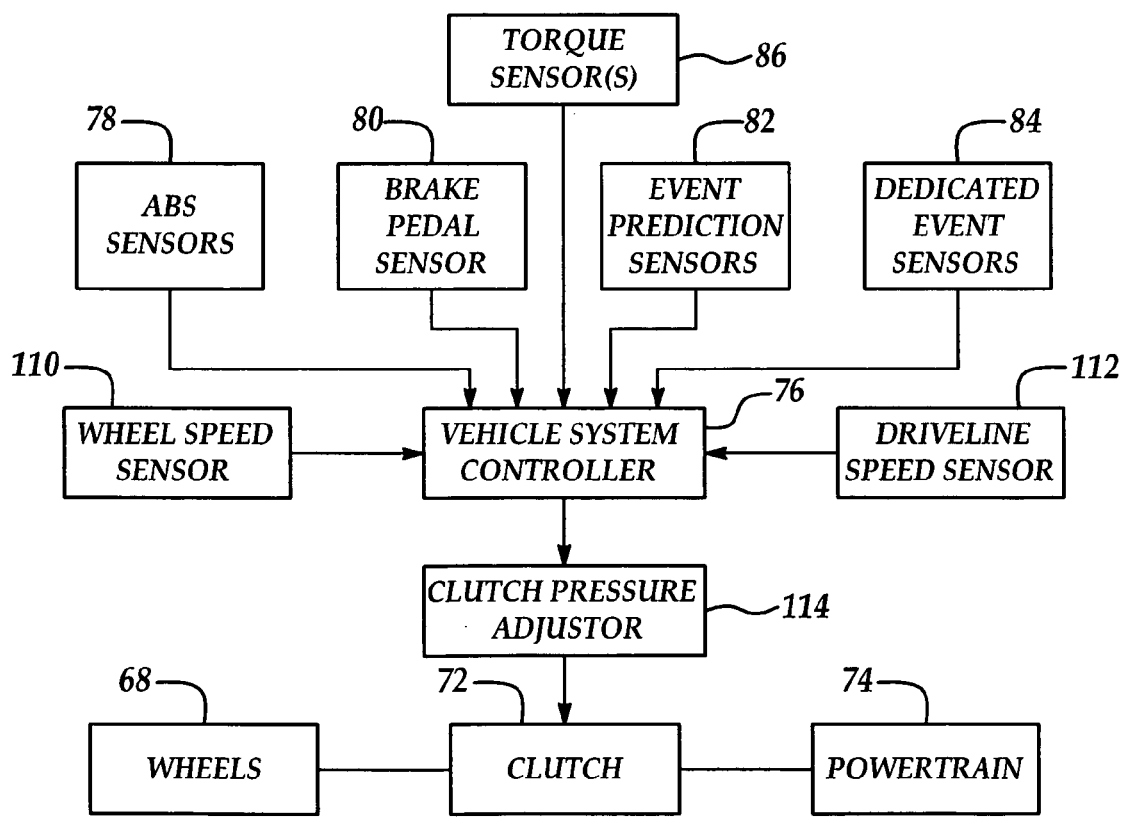
FIG. 3 is block diagram showing another embodiment of the invention which employs active clutch control.

Alternately, to provide more flexibility and quicker clutch reaction times, an active torque limiting system may be employed in which certain operating parameters of the clutch 72 are controlled or adjusted immediately prior to its activation in response to a braking event producing reactive torque. FIG. 3 shows a torque limiting system that employs active control of the clutch 72. Like the previously described embodiment, the clutch. 72 shown in FIG. 3 is also automatically actuated in response to reactive torque applied on its output shaft. In this alternate embodiment however, the level of resistance by the clutch 72 to reactive torque can be varied. In other words, the point at which the clutch 72 begins to slip in response to reactive torque can be controlled, based on any of a variety of operating conditions and events. The resistance or "slip"0 level of the clutch 72 is determined by a signal delivered to the clutch 72 by a clutch pressure adjustor 114 based on commands issued by a controller 76. The adjustor 114 may be any of various known devices that generates an output control signal capable controlling an adjustment mechanism in the clutch 72 to either increase or decrease the clutch pressure. This signal may be mechanical, hydraulic or electrical, depending on the exact construction of the clutch 72. The controller 76 may be a dedicated, programmed device, or an existing controller on the vehicle which is used to set the clutch pressure as an auxiliary operating function.

The command signal issued by the controller 76 to the clutch pressure adjustor 114 is essentially indicative of either an anticipated or an already-commenced braking event predicted to produce undesired levels of reactive-torque in the powertrain 74. The controller 76 commands the adjustor 114 to reset the pressure in the clutch 72 in response to any of a variety of vehicle events or operating conditions indicating or suggesting an aggressive or sudden braking event. Examples of such signals are those produced by the vehicle's existing ABS sensors 78, brake pedal brake travel sensors 80 or various crash prediction sensors 82 used to predict conditions suggesting that a crash and associated sudden might be eminent.

Alternatively, the reactive torque control system may rely on its own dedicated event sensors 84 which could comprise, by way of example, inertial sensors or body deflection sensors that sense events suggesting sudden braking is eminent or has commenced. Similarly, torque sensors 86 mounted on the transaxle housing or engine block 42, or their mounts 70 could be used to sense when an unusually high reactive torque is present in the powertrain 74 which requires activation of the clutch 72 to at least partially disengage the powertrain 74 from the wheels 68. In any event, it is important that the various sensors or other signal generators ultimately resulting in the resetting of the clutch pressure have a particularly rapid response time so that the powertrain is partially disengaged before significant reactive torque can be transmitted through the driveline.

The use of the controller 76 to dynamically adjust clutch pressure provides the control system with additional flexibility, and accommodates a wide variety of operating conditions where it is desirable to clutch pressure because of dynamic and unpredictable operating conditions. Thus, for example, when certain vehicle sensors predict that a sudden braking event is likely to occur, the controller 76 can command the adjustor 114 to change the clutch pressure to a first readiness level. When other events are sensed suggesting that the braking event has commenced, the controller 76 can issue a second command to the adjustor 114 that results in the clutch pressure being reset to a second readiness level. In addition to preparing the clutch 72 for a sudden braking event by changing the clutch pressure in advance of the event, the active control system described above can be employed to dynamically adjust clutch pressure during the braking event. Such dynamic clutch control may be advantageous in a variety of applications, such as where dynamic control of the reactive torque is used in concert with the vehicle's ABS system to enhance vehicle braking.

In some cases following an event of clutch slippage to control reactive torque, there may be a substantial difference between the speed of the wheels 68 and that of the powertrain components that have been partially disconnected from the wheels 68. In this situation, it may be desirable to quickly bring the speeds of the powertrain 74 and the wheels 68 within a certain range before the clutch pressure is reset to its normal operating value. Thus, it may be desirable to synchronize the driveline speed with that of the wheels before they are reconnected. This is achieved by sensing both the driveline and wheel speeds using corresponding sensors 110, 112, and determining the speed difference using the controller 76. Based on the determined speed difference, the controller transmits a control signal to any of the motor 54, generator 36 or the engine 10 to increase driveline speed until it is within a preselected range of the wheel speed, at which time the controller 76 commands the adjustor to rest the clutch pressure.

Figure 5:
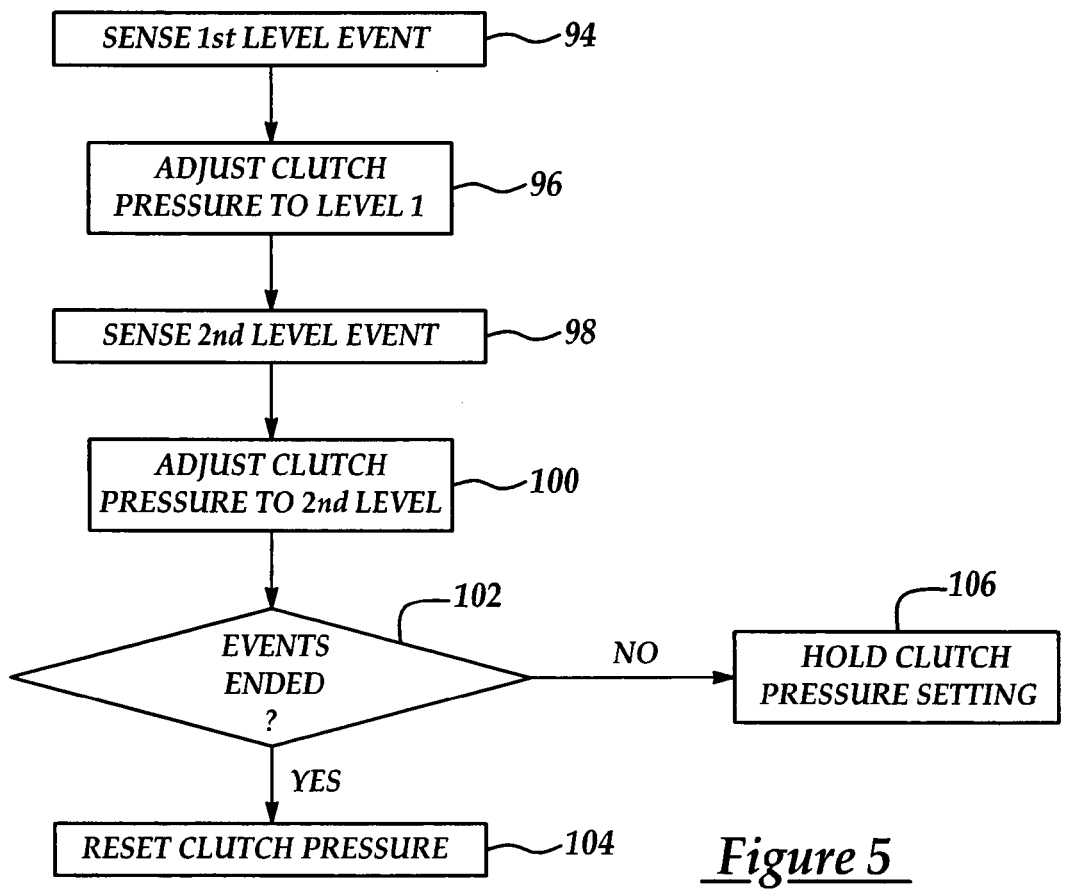
FIG. 5 is a flowchart showing the steps employed in adjusting clutch pressure which forms part of the method for limiting reactive torque.

Attention is now also directed to FIG. 5 which shows the basic steps employed in carrying out the control method of the invention. First, the brake and other systems on the vehicle are monitored to determine whether a sudden braking event has occurred, is about to commence, or could potentially occur in the immediate future. As previously discussed, this monitoring function is performed by any a variety of sensors on the vehicle which feed information to the controller 76. The events or conditions being sensed may be prioritized into two or more groups. Thus, $1^{st}$ level events are sensed at 94, such as those suggesting that a sudden braking event is likely to occur or may be eminent. Upon sensing one or more $1^{st}$ level events, the controller 76 issues a command to the adjustor 114 which in turn adjusts the pressure of the clutch 72 to a $1^{st}$ level, as shown at step 96. Then, when the system senses a $2^{nd}$ level event at step 98, typically a condition indicating that sudden braking has actually commenced, the clutch pressure is adjusted to a second level as shown at step 100. The system continues the monitoring process until the events giving rise to clutch pressure adjustment have ended, as shown at step 102. If the events have not ended, the last clutch pressure setting is maintained, as shown at step 106. However, if the events have ended, then the clutch pressure is reset to its normal value, as indicated at step 104.

It is to be understood that the specific methods and techniques which have been described are merely illustrative of one application of the principle of the invention. Numerous modifications may be made to the method as described without departing from the true spirit and scope of the invention.

What is claimed is:

1. A method of limiting including eliminating reactive torque transmitted from a set of driven traction wheels to a powertrain during a sudden braking event, comprising:

slipping a drive component comprising a clutch disposed between the traction wheels and the powertrain during the sudden braking event, to thereby eliminate an amount of reactive torque at and above a first value of reactive torque transmitted from the traction wheels to the powertrain, said drive component disposed on the traction wheel side of said powertrain, said powertrain comprising a first gear assembly connected to a drive motor;

wherein said clutch is adjusted to slip at a slip level at and above said first value of reactive torque, said adjustment prior to commencement of said sudden braking event.

2. The method of claim 1, wherein the slipping step comprises slipping a plurality of clutch plates when the reactive torque is at and above said preset reactive torque value.

3. The method of claim 1, wherein the slipping step is commenced in direct response to the reactive torque applied to the drive component.

4. The method of claim 1, further comprising:
determining that a sudden braking event is about to occur;
setting said slip level of the drive component to said first reactive torque value allowing a first level of reactive torque below said first reactive torque value to be transmitted from the traction wheels to the powertrain on a drive motor side of said drive component; and,
setting the slip level of the drive component to a second reactive torque value when it has been determined that said sudden braking event has commenced to eliminate an amount of reactive torque at and above said second reactive torque value transmitted from said traction wheels to said powertrain.

5. The method of claim 4, further comprising, after the step of setting the slip level to a second reactive torque value, resetting the slip level of the drive component to the first value of reactive torque upon completion of said sudden braking event.

6. The method of claim 5, wherein the slipping step comprises interposing a second drive component comprising a slip clutch between the traction wheels and a second gear assembly on the traction wheel side of the first gear assembly.

7. A method for controlling a hybrid vehicle powertrain system during a sudden braking event in which reactive torque is produced by braking the vehicle's wheels, comprising the step of eliminating an amount of reactive torque at and above a preselected reactive torque value transmitted from the wheels to the powertrain by slipping a drive component comprising a slip clutch disposed on the wheel side of said powertrain, said power train comprising a gear assembly connected to a drive motor;

wherein said slip clutch is adjusted to slip at and above said preselected value of said reactive torque, said step of adjusting taking place prior to said sudden braking event.

8. The method of claim 7, wherein the slip clutch is further adjusted to slip at and above a second value of said reactive torque upon commencement of said sudden braking event.

9. A method for controlling a hybrid vehicle powertrain system during a sudden braking event in which excessive driveline torque is produced by rapidly braking the vehicle's wheels, comprising the steps of:
transmitting positive torque from said powertrain to the wheels through a driveline component comprising a slip clutch during normal driving conditions;
eliminating an amount of negative torque at or above a preselected level of negative torque transmitted from the wheels through the driveline component to the powertrain during a sudden braking event by slipping said slip clutch at and above said preselected level of negative torque caused by braking force applied to the wheels, said driveline component disposed on the wheel side of a gear assembly connected to a drive motor;

wherein said slip clutch is adjusted to slip at and above said preselected level of negative torque prior to and during said sudden braking event.

10. A drive system for a vehicle, comprising:
a powertrain including at least one electric drive motor, at least one drive wheel; and,
a driveline including a slip clutch, the slip clutch disposed on the drive wheel side of a gear assembly connected to a drive motor, the slip clutch connecting the powertrain with the drive wheel, the slip clutch transmitting positive torque from the powertrain to the drive wheel during normal driving conditions but allowing slipping during a sudden braking event to limit the amount of torque transmitted from the drive wheel to the powertrain caused by braking force applied to the drive wheel;
wherein the slip clutch includes a plurality of friction plates and springs for biasing the plates into engagement with each other.

11. The drive system of claim 10, wherein the biasing force of the springs is adjustable.

12. The drive system of claim 10, further comprising a sensor for sensing the commencement of a sudden braking event, and a controller responsive to the sensor for adjusting the biasing force of the springs whereby to adjust the amount of torque transmitted from the wheels to the powertrain.

13. A hybrid vehicle drive system, comprising:
an internal combustion engine connected to a first gear assembly;
an electric drive motor connected to a second gear assembly;
at least one traction wheel;
a driveline connecting the traction wheel with the combination of the internal combustion engine and the electric drive motor;
a vehicle braking system for applying a brake force to the traction wheel during a braking event; and,
a control system including at least one slip clutch disposed in said driveline on the traction wheel side of said first and second gear assemblies for controlling the torque transmitted from the traction wheel through the driveline during a sudden braking event;
wherein the slip clutch includes a plurality of clutch plates and springs for biasing the plates into engagement with each other.

14. The drive system of claim 13, wherein the amount of torque transmitted by the slip clutch from the drive wheel to the driveline is adjustable.

15. The drive system of claim 14, wherein the control system comprises:
at least one sensor producing a signal indicting the occurrence of a sudden braking event, and a controller automatically responsive to the sensor signal for adjusting the slip clutch.

16. The method of claim 1, wherein the clutch comprises a slip clutch comprising a plurality of friction plates and springs for biasing the plates into engagement with each other.

17. The method of claim 16, wherein the biasing force of the springs is adjustable.

18. The method of claim 16, further comprising a sensor for sensing the commencement of said sudden braking event, and a controller responsive to the sensor for adjusting the biasing force of the springs whereby to adjust the slip level of said slip clutch.

19. The method of claim 1, wherein the powertrain comprises an electric motor.

20. The method of claim 1, wherein said clutch comprises an electromagnetic clutch.

21. The method of claim 7, wherein the slip clutch comprises a plurality of friction plates and springs for biasing the plates into engagement with each other.

22. The method of claim 13, wherein the slip clutch comprises a plurality of friction plates and springs for biasing the plates into engagement with each other.

* * * * *